May 10, 1960 J. R. WHITE 2,936,384

SIX JUNCTION TRANSISTOR SIGNAL-TRANSLATING SYSTEM

Filed April 12, 1957

2,936,384

SIX JUNCTION TRANSISTOR SIGNAL-TRANSLATING SYSTEM

John R. White, Westbury, N.Y., assignor to Hazeltine Research, Inc., Chicago, Ill., a corporation of Illinois Application April 12, 1957, Serial No. 652,578

9 Claims. (Cl. 307—88.5)

*General*

The present invention is directed to semiconductor signal-translating devices and, more particularly, to signal-translating systems employing such devices. While signal-translating systems of the type under consideration have a variety of applications, they are particularly useful for sampling signals, modulating signals, or for controlling apparatus as in gating or switching applications. Accordingly, the invention will be described in the environment of gating and modulating systems.

In the vacuum-tube art various electron tubes, such as the 6AR8, are available for particular purposes. In general, these tubes comprise double-anode sheet-beam tubes containing a pair of balanced deflectors for selectively directing the electron beam thereof to either of the two anodes. Such devices have utility in a variety of switching and gating applications, such as in the burst gate circuits of color-television receivers and in the synchronous detectors thereof. Insofar as applicant is aware, transistor counterparts of such tubes and control circuits employing transistors do not exist.

It is an object of the present invention, therefore, to provide a new and improved transistor signal-translating device which is useful in application of the type mentioned above.

It is another object of the invention to provide a new and improved transistor signal-translating device which can be employed for current-switching purposes, modulating functions, sampling, coincidence detection, gating, and a wide variety of control purposes.

It is a further object of the invention to provide a new and improved multiple-unit transistor device.

It is a still further object of the present invention to provide a new and improved signal-translating system which is useful for current-switching purposes, modulating functions, sampling, coincidence detection, gating, and other control purposes.

In accordance with the invention a signal-translating system comprises means effectively including a pair of transistors of like conductivity type and each effectively including an emitter zone, a base zone, and a collector zone and means effectively connecting the collector zone of the first of said pair directly with the emitter zone of the second thereof. The system also includes a first signal-translating channel including said transistors in cascade and input circuit means coupled between the base and emitter zones of said first transistor and output circuit means coupled between the emitter zone of said first and the collector zone of said second of said pair of transistors. The system additionally includes a second signal-translating channel including control means coupled between said connecting means and said emitter zone of said first of said pair of transistors for controlling a characteristic of each of said channels.

For a better understanding of the present invention, together with other and further objects thereof, reference is had to the following description taken in connection with the accompanying drawing, and its scope will be pointed out in the appended claims.

Referring to the drawing.

Figure 1:
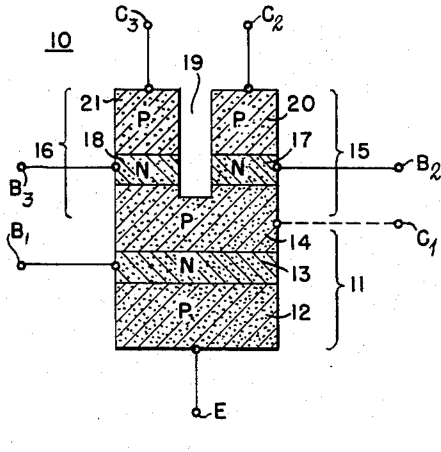
Fig. 1 is a representation of a signal-translating device embodying the present invention in a particular form.

*Description of signal-translating device of Fig. 1*

Referring now to Fig. 1 of the drawing, the signal-translating device there represented comprises a compound or multiple-unit transistor 10 which includes a first junction transistor 11 having emitter, base, and collector zones 12, 13, and 14, respectively. The compound transistor 10 also includes second and third junction transistors 15 and 16, respectively, which together have two base zones 17 and 18 separated by a narrow slot 19 and also have collector zones 20 and 21 separated by the same slot. The transistors 15 and 16 also have an electrically common emitter zone which is also common with the collector zone 14 of the first transistor 11. It will be understood that these transistors may be of the grown-junction type, the alloy-junction type, or other suitable junction types. For convenience, it will be assumed that they are of the PNP grown-junction type. The compound transistor 10 may be constructed by cutting a slot, as indicated, with a diamond saw or other suitable which includes five successive contiguous layers or zones means in a single crystal of semiconductive material of opposite conductivity types, such as PNPNP zones. Alternatively, the single crystal may be composed of five contiguous NPNPN zones in which case the compound transistor is then of the opposite "sex" and has the full equivalent of the one represented but requires biasing potentials of opposite polarity from that represented. Individual external circuit connections are made to individual ones of the zones. To that end, the first transistor 11 includes emitter and base zone connections E and $B_1$ and, for some applications, may include a collector zone connection $C_1$. The second transistor 15 includes base and collector zone connections $B_2$ and $C_2$, respectively, while the third transistor 16 includes base and collector zone connections $B_3$ and $C_3$, respectively.

Figure 2:
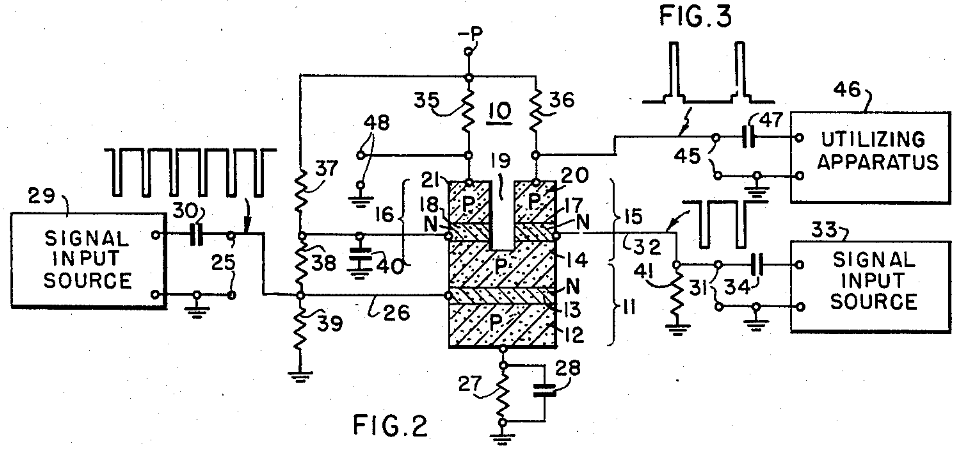
Fig. 2 is a circuit diagram, partly schematic, of a signal-translating system also in accordance with the invention and which includes the signal-translating device of Fig. 1.

*Description of Fig. 2 signal-translating system*

In Fig. 2 there is represented a circuit diagram of a signal-translating system in accordance with the invention which includes the signal-translating device 10 of Fig. 1. Corresponding transistor elements in Fig. 2 are designated by the same reference numerals employed in Fig. 1 of the drawing. The signal-translating system of Fig. 2 comprises means effectively including a pair of transistors of like conductivity type and each effectively including an emitter zone and a collector zone. This means comprises the transistors 11 and 15. The signal-translating system of Fig. 2 also includes means effectively connecting the collector of the first of the pair of transistors directly with the emitter of the second thereof. Since the collector zone 14 is common to the transistors 11 and 15, this zone comprises the means just mentioned. The signal-translating system additionally includes a first input-signal applying means coupled between the base zone 13 and the emitter zone 12 of the first transistor 11. This means includes a pair of terminals 25, 25 and a connection 26 between the ungrounded one of the terminals and the base zone 13 and further includes a biasing resistor 27 and a parallel-connected bypass condenser 28 connected between the emitter zone 12 and ground. This first input-signal applying means may also be considered to include a signal input source 29 having one terminal grounded and its other terminal connected through a coupling condenser 30 to the ungrounded one of the input terminals 25, 25. The signal-translating system further includes a second input-signal applying means coupled between the base zone 17 of the second transistor 15 and the emitter zone 12 of the first transistor 11. This means includes a pair of terminals 31, 31, one of which is grounded and the other is connected through a connection 32 to the base zone 17. This second input-signal applying means may also be considered to include a signal input source 33, one terminal of which is grounded and the other of which is connected through a coupling condenser 34 to the ungrounded one of the input terminals 31, 31.

The signal-translating system of Fig. 2 additionally includes means coupled to the transistors for normally enabling the first and third transistors 11 and 16 and for normally disabling the second transistor 15. This means is a biasing means and includes a source of unidirectional potential indicated as —P which is connected to the collector zones 20 and 21 through resistors 36 and 35, respectively, and a voltage divider comprising the series-connected resistors 37, 38, and 39 connected between the aforesaid source and ground. The junction of the resistors 37 and 38 is connected directly to the base zone 18 while the junction of resistors 38 and 39 is connected directly to the base zone 13 for supplying suitable biasing potentials thereto. The biasing means further includes a resistor 41 connected between the base zone 17 and ground. The resistors just mentioned together with the source —P and the stabilizing resistor 27 develop suitable biases which normally maintain the transistors 16 and 11 in a signal-translating or enabling condition while normally maintaining the transistor 15 in a disabled or nontranslating condition. A condenser 40 is connected between the base zone 18 and ground for assuring that the base zone is maintained at a substantially constant operating potential.

The signal-translating system comprises a first signal-translatnig channel including the first and second cascade-connected transistors 11 and 15 and also comprises output circuit means coupled between the emitter zone of the first transistor 11 and at least one of the collector zones of the second and third transistors 15 and 16. A first output circuit means in the form of terminals 45, 45 has one terminal thereof connected to ground while the other is connected directly to the collector zone 20 of transistor 15. This output circuit means may also be considered to include a coupling condenser 47 and a suitable utilizing apparatus 46. For some applications it may be desirable to employ a second output circuit means in the form of a pair of terminals 48, 48, one of which is connected directly to the collector zone 21 of transistor 16 while the other terminal thereof is grounded.

The signal-translating system still further includes a second signal-translating channel including control means coupled between the common collector zone 14 and the emitter zone of the first pair of transistors 11 for controlling a characteristic of each of the first and second signal-translating channels. The control means just mentioned comprises the transistor 16 and further includes emitter biasing network 27, 28 and the first transistor 11.

*Operation of signal-translating system of Fig. 2*

Figure 3:
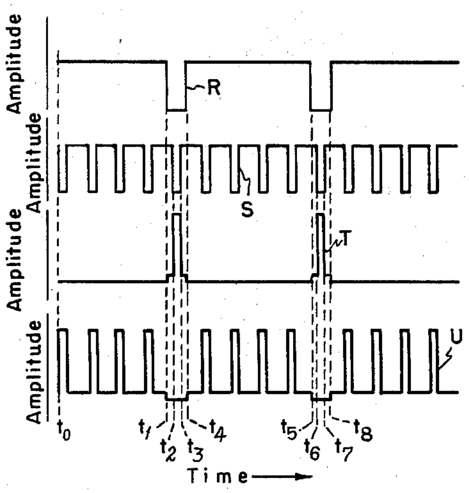
Fig. 3 is a graph utilized in explaining the operation of the system of Fig. 2.

In considering the operation of the system of Fig. 2 it will be assumed that a series of negative-going pulses, as represented by curve S of Fig. 3, developed by the signal input source 29 are applied to the first input-signal applying means or terminals 25, 25 and that a similar series of longer duration negative-going pulses, represented by curve R of Fig. 3, having a much lower repetition rate are applied by the source 33 to the second input-signal applying means or terminals 31, 31. It will further be assumed that the system represents a decoder which is effective during each coincidence of input pulses from source 29 and from source 33 to translate an output pulse to the utilizing apparatus 46 which may constitute a suitable apparatus such as a transponder. As previously mentioned, the transistors 11 and 16 are biased so that they normally are in a translating condition while the transistor 15 is normally disabled or in a nontranslating condition. The application of negative-going pulses of curve R to the base zone 17 of transistor 15 during the intervals $t_1$—$t_4$ and $t_5$—$t_8$ renders that transistor conductive or in a state wherein it can translate a signal to its collector zone 20 during those intervals. Since the transistor 15 is connected in an emitter-follower relation, the emitter zone 14 swings negatively substantially simultaneously with the negative swing of the pulses applied to its base zone 17. Since emitter zone 14 is common to transistors 15 and 16, the negative swing of that zone with relation to the relatively fixed potential of zone 18 effectively disables or places the transistor 16 in its nontranslating state. Coincidence occurs during the intervals $t_2$—$t_3$ and $t_6$—$t_7$ between the signals applied to the base zone of transistor 11 and the base zone of transistor 15 so that the signal-translating channel through the transistors 15 and 11 is completed whereby an output signal is developed across the output terminals 45, 45. This output signal is represented in curve T of Fig. 3 and it will be noticed that it has a low-amplitude pedestal occurring during the intervals $t_1$—$t_4$ and $t_5$—$t_8$ with the larger amplitude short duration pulses superimposed thereon and occurring during the intervals $t_2$—$t_3$ and $t_6$—$t_7$ which are equal to the durations of the corresponding pulses of curve S. Thus, the signal-translating system of Fig. 2 is effectively acting as a coincidence detector and, hence, is useful for performing decoding operations. The output pulses of curve T may be employed to trigger the utilizing apparatus 46 when the latter constitutes a transponder. For some purposes, it may be desirable to derive at the output terminals 48, 48 the signal of curve U which is complementary to the one of curve T appearing at output terminals 45, 45. It will be observed that the larger amplitude pulses are missing in curve U during the intervals $t_2$—$t_3$ and $t_6$—$t_7$.

While the operation of the signal-translating system of Fig. 2 has been explained in relation to a decoding or switching system, it will be appreciated by one skilled in the art that it is utilized as a sampling system wherein it is desired to obtain samples of the signal applied to the input terminals 31, 31. Assuming that a signal of varying amplitude, such as a sine wave, is applied to the terminals 31, 31 instead of the pulses of curve R, it will be appreciated that samples of that wave having a duration corresponding to a duration of a pulse of curve S may be obtained at the output terminals 45, 45 of this system.

Figure 4:
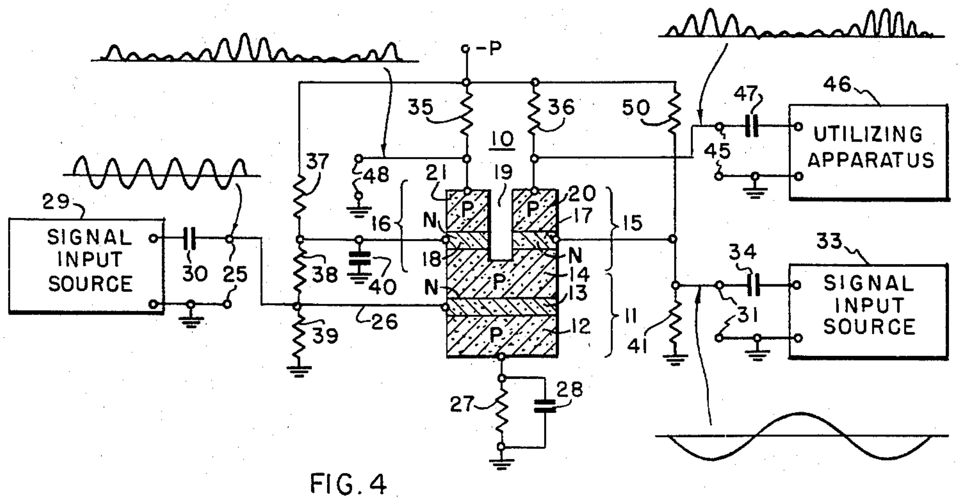
Fig. 4 is a circuit diagram, partly schematic, of a modification of the signal-translating system of Fig. 1.

*Description and operation of signal-translating system of Fig. 4*

Referring now to Fig. 4 of the drawing, there is represented a signal-translating system which has utility as a modulator. This system is substantially identical with that of Fig. 2 and corresponding elements are designated by the same reference numerals. The modulator system of Fig. 4 differs from that of Fig. 2 in the type of signal applied to the input terminals and also in the magnitude of the biases applied to the transistors. The biasing circuit for the base zone 17 of transistor 15 includes a pair of series-connected resistors 50 and 41 which are connected between the source —P and ground, the junction of the resistors being connected directly to the base zone 17. The magnitude of the potential −P and the resistors is selected so that the three transistors are in a signal-translating condition. Assuming that sine-wave signals are applied to the input terminals 25, 25 and 31, 31 and that the signal applied to the last-mentioned terminals swings over a comparatively linear region of the operating characteristic of transistor 15, there will be developed at the output terminals 45, 45 a signal modulated as represented by the curve just above those terminals while a similar but oppositely modulated signal appears at the output terminals 48, 48 associated with the transistor 16. This results since the signal applied to the base zone 17 and the transistor 15 acts to alter the conductivity or translating characteristic of that transistor in the same sense as the swing of the applied signal. However, since the transistor 16 responds to the signal applied to the terminals 31, 31 in a sense opposite to the response of the transistor 15, a negatively modulated output signal appears at the terminals 48, 48. It will be appreciated that in this example the horizontal lines associated with the signals just described do not represent ground or reference potential and that, in fact, the signals associated with terminals 45, 45 and 48, 48 are completely negative with respect to ground.

From the foregoing description it will be seen that a signal-translating system in accordance with the present invention is useful for current-switching purposes, modulating functions, sampling, coincidence detection, gating, and a variety of other control purposes. It will also be clear that the novel signal-translating device of the present invention may be utilized to perform switching and gating functions such as are performed by special vacuum tubes such as 6AR8.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A signal-translating system comprising: means effectively including a pair of transistors of like conductivity type and each effectively including an emitter zone, a base zone, and a collector zone; means effectively connecting the collector zone of the first of said pair directly with the emitter zone of the second thereof; a first signal-translating channel including said transistors in cascade and input circuit means coupled between the base and emitter zones of said first transistor and output circuit means coupled between the emitter zone of said first and the collector zone of said second of said pair of transistors; and a second signal-translating channel including control means coupled between said connecting means and said emitter zone of said first of said pair of transistors for controlling a characteristic of each of said channels.

2. A signal-translating system comprising: means effectively including a pair of transistors of like conductivity type and each effectively including an emitter zone, a base zone, and a collector zone; means effectively connecting the collector zone of the first of said pair directly with the emitter zone of the second thereof; a first signal-translating channel including said transistors in cascade and input circuit means coupled between the base and emitter zones of said first transistor and output circuit means coupled between the emitter zone of said first and the collector zone of said second of said pair of transistors; and a second signal-translating channel including a transistor coupled between said connecting means and said emitter zone of said first of said pair of transistors for controlling a characteristic of each of said channels.

3. A signal-translating system comprising: means effectively including a pair of transistors of like conductivity type and each effectively including a base zone, an emitter zone, and a collector zone; means effectively connecting the collector zone of the first of said pair directly with the emitter zone of the second thereof; a first input-signal applying means coupled between the base zone and the emitter zone of the first transistor of said pair; a second input-signal applying means coupled between the base zone of the second transistor of said pair and said emitter zone of said first transistor; a first signal-translating channel including said transistors in cascade and output circuit means coupled between the emitter zone of said first and the collector zone of said second of said pair of transistors; and a second signal-translating channel including a transistor coupled between said connecting means and said emitter zone of said first transistor and responsive to an input signal from said second applying means for controlling the signal-translating characteristics of each of said channels.

4. A signal-translating system comprising: a first junction transistor including emitter, base, and collector zones; second and third junction transistors each having a base and a collector zone and an electrically common emitter zone which is also common with said collector zone of said first transistor; a first input-signal applying means coupled between said base zone of said first transistor and the emitter zones of both said first and third transistors; a second input-signal applying means coupled between said base zone of said second transistor and said emitter zone of said first transistor; a first signal-translating channel including said first and second transistors; output circuit means coupled between said emitter zone of said first transistor and at least one of said collector zones of said second and third transistors; and a second signal-translating channel including said collector zone of said third transistor and said emitter zone of said first transistor and responsive to an input signal from said second applying means for controlling the signal-translating characteristics of each of said channels.

5. A signal-translating system comprising: a multiple-unit transistor device which includes a first junction transistor including emitter, base, and collector zones and which includes second and third junction transistors each having a base and an emitter zone and an electrically common emitter zone that is also common with said collector zone of said first transistor; a first input-signal applying means coupled between said base zone of said first transistor and the emitter zones of both said first and third transistors; a second input-signal applying means coupled between said base zone of said second transistor and said emitter zone of said first transistor; a first signal-translating channel including said first and second transistors and output circuit means coupled between said emitter zone of said first transistor and at least one of said collector zones of said second and third transistors, and a second signal-translating channel including said collector zone of said third transistor and said emitter zone of said first transistor and responsive to an input signal from said second applying means for controlling the signal-translating characteristics of each of said channels.

6. A sampling system comprising: a first junction transistor including emitter, base, and collector zones; second and third junction transistors each having a base and an emitter zone and an electrically common emitter zone which is also common with said collector zone of said first transistor; a first input-signal applying means coupled between said base zone of said first transistor and the emitter zones of both said first and third transistors for applying thereacross a first signal to be sampled; a second input-signal applying means coupled between said base zone of said second transistor and said emitter zone of said first transistor for applying thereto gating pulses; a first signal-translating channel including said first and second transistors and output circuit means coupled between said emitter zone of said first transistor and said collector zone of said second transistor; and a second signal-translating channel including said collector zone of said third transistor and said emitter zone of said first transistor and responsive to said gating pulses for controlling the signal-translating characteristics of each of said channels and deriving in said output circuit samples of said first signal having a duration corresponding to that of said gating pulses.

7. A switching system comprising: a first junction transistor including emitter, base, and collector zones; second and third junction transistors each having a base and a collector zone and an electrically common emitter zone which is also common with said collector zone of said first transistor; a first input-signal applying means coupled between said base and emitter zones of said first transistor; a second input-signal applying means coupled between said base zone of said second transistor and said emitter zone of said first transistor; means coupled to said transistors for normally enabling said first and third transistors and for normally disabling said second transistor; a first signal-translating channel including said first and second transistors and output circuit means coupled between said emitter zone of said first transistor and at least one of said collector zones of said second and third transistors; and a second signal-translating channel including said collector zone of said third transistor and said emitter zone of said first transistor and responsive to an input signal from said second applying means for disabling said third transistor and second channel and enabling said second transistor and first channel during intervals of coincidence of an input signal from said first signal-applying means and said input signal from said second applying means.

8. A modulator system comprising: a first junction transistor including emitter, base, and collector zones; second and third junction transistors each having a base and a collector zone and an electrically common emitter zone which is also common with said collector zone of said first transistor; a first input-signal applying means coupled between said base and emitter zones of said first transistor for applying thereto a first periodic signal; a second input-signal applying means coupled between said base zone of said second transistor and said emitter zone of said first transistor for applying thereto a second periodic signal; means coupled to said transistors for normally maintaining said transistors in a translating condition; a first signal-translating channel including said first and second transistors; output circuit means coupled between said emitter zone of said first transistor and at least one of said collector zones of said second and third transistors; and a second signal-translating channel including said collector zone of said third transistor and said emitter zone of said first transistor and responsive to said second signal for controlling the signal-translating characteristics of each of said channels to modulate said signals and derive in said output circuit a modulated signal.

9. A modulator system comprising: a first junction transistor including emitter, base, and collector zones; second and third junction transistors each having a base and a collector zone and an electrically common emitter zone which is also common with said collector zone of said first transistor; a first input-signal applying means coupled between said base and emitter zones of said first transistor for applying thereto a first periodic signal; a second input-signal applying means coupled between said base zone of said second transistor and said emitter zone of said first transistor for applying thereto a second periodic signal; means coupled to said transistors for normally maintaining said transistors in a translating condition; a first signal-translating channel including said first and second transistors; a pair of output circuit means coupled between said emitter zone of said first transistor and said collector zones of said second and third transistors; and a second signal-translating channel including said collector zone of said third transistor and said emitter zone of said first transistor and responsive to said second signal for controlling the signal-translating characteristics of each of said channels to modulate said signals and derive in one of said output circuit means a positively modulated signal and to derive in the other thereof a negatively modulated signal.

References Cited in the file of this patent

UNITED STATES PATENTS

| | | |
|---|---|---|
| 2,663,806 | Darlington | Dec. 22, 1953 |
| 2,663,830 | Oliver | Dec. 22, 1953 |
| 2,691,075 | Schwartz | Oct. 5, 1954 |
| 2,698,392 | Herman | Dec. 28, 1954 |
| 2,710,928 | Whitney | June 14, 1955 |
| 2,728,857 | Sziklai | Dec. 27, 1955 |
| 2,748,041 | Leverenz | May 29, 1956 |
| 2,791,644 | Sziklai | May 7, 1957 |
| 2,825,810 | Zeidler | Mar. 4, 1958 |
| 2,831,126 | Linvill et al. | Apr. 15, 1958 |